UNITED STATES PATENT OFFICE.

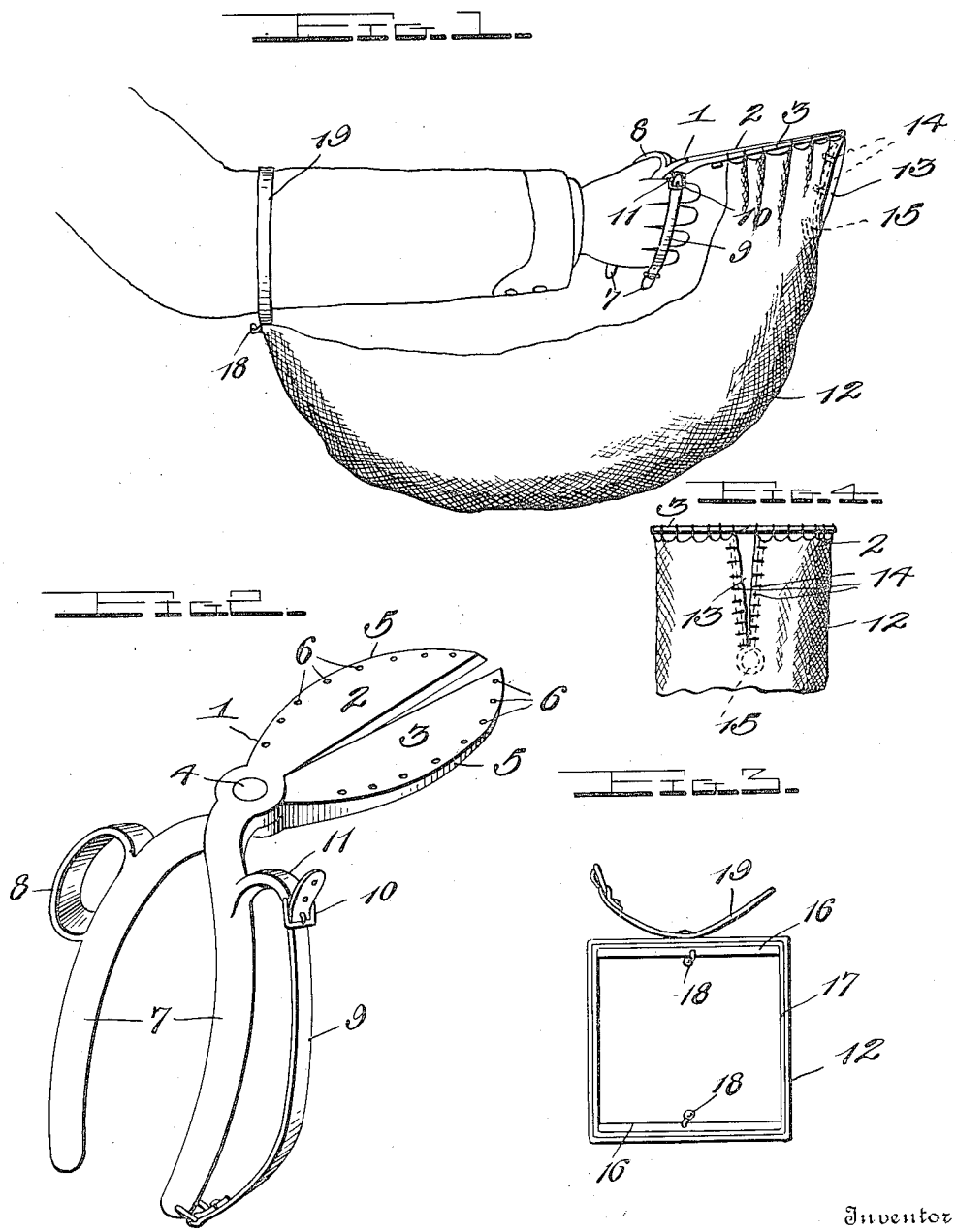

FREDERICK T. LILLICK, OF HAMILTON, MONTANA.

FRUIT-CUTTER.

1,042,240.

Specification of Letters Patent. Patented Oct. 22, 1912.

Application filed April 22, 1912. Serial No. 692,452.

*To all whom it may concern:*

Be it known that I, FREDERICK T. LILLICK, a citizen of the United States, residing at Hamilton, in the county of Ravalli and State of Montana, have invented certain new and useful Improvements in Fruit-Cutters, of which the following is a specification, reference being had to the accompanying drawings.

This invention relates to new and useful improvements in fruit cutters and has for its object to provide a device of this character whereby the fruit is quickly and easily clipped from the tree and received into a suitable receptacle at one operation.

A further object of the invention is to provide a novel pair of shears or clippers having a receiving sack or receptacle connected thereto and arranged beneath the clippers to receive the fruit after the same has been clipped from the tree.

A still further object of the invention is the provision of a device of this character which will possess advantages in points of efficiency and durability, is inexpensive of manufacture and at the same time is simple in construction and operation.

With the above and other objects in view the invention consists in the novel features of construction and the combination and arrangement of parts hereinafter more fully described, pointed out in the claims and shown in the accompanying drawings, in which, Figure 1 is a side elevation of my device showing the manner in which the device is adapted to be used. Fig. 2 is a perspective view of the shears or clippers. Fig. 3 is a rear end elevation of the receiving sack or receptacle showing the same in an open position. Fig. 4 is a detail view illustrating the front side of said receptacle at the forward or upper end thereof.

Referring more particularly to the drawings, 1 indicates the shears or clippers, which comprise the oppositely disposed cutting blades 2 and 3 pivotally connected at their inner ends by means of the rivet 4, said blades being constructed so that their outer edges are substantially oval shaped in form as shown at 5 and are provided with a plurality of spaced openings 6 for a purpose which will be hereinafter more specifically pointed out. Formed integral with the inner ends of the blades and arranged in parallel relation are the handle members 7, one of which is provided on its outer side with a suitable thumb hold 8 which is arranged adjacent the inner end of the handle member. Secured to the outer end of the other handle member is a strap 9, having its free end detachably connected to the buckle 10 secured to the outer end of the curved arm 11, which is formed integral with the handle member adjacent the inner end thereof. The handle members 7 are to be disposed substantially at right angles to the cutting blades so as to give a freer motion to the cutting blades.

A receiving sack or receptacle 12 is provided having its upper end secured to the outer edge 5 of the blades by having the thread or cord passed through the opening 6 and through the upper end of the bag. The front side of the receptacle is slit as shown at 13 to provide a suitable opening for the passage of the fruit when the same is about to be clipped from the tree. Arranged in the upper end of the bag and suitably secured thereto by means of the loops 14 is a spring member 15 which helps to hold the slit 13 of the receptacle in an open position when the cutting blades 2 and 3 are forced apart.

Arranged transversely across the rear end of the receptacle and secured on the inner side thereof are the strips or cleats 16 which may be of wood, metal or other suitable material. Elastic bands 17 are arranged in the lower end of the receptacle and secured to said strips, the tension of said bands being adapted to bring the cleats 16 into engagement with each other so as to close the rear end of the receptacle, the same being held in its closed position by means of the catch members 18. Secured to the receptacle at the lower end thereof is an adjustable strap 19 which is adapted to encircle the arm of the operator to support the lower end of the receptacle.

In using my improved clipper, the handle members 7 are to be grasped by the hand, the strap 9 being then tightened so that the handle members cannot be easily removed from the hand of the operator. In clipping the fruit from the tree the cutting blades 2 and 3 are forced apart by the movement of the hand which will force the upper end of the receptacle open so that the fruit can easily pass in through the opening 13, and the stem of the fruit will be disposed directly between the cutting blades which when brought together will sever the fruit from the tree. It will be seen that by clipping the fruit from the tree in this manner any required length of the stem will remain on the fruit to prevent the rapid decay of the same. After the receptacle has been filled the rear end of the same can be easily opened by the other or free hand of the operator to dump the contents of the receptacle into a suitable container or shipping case.

While I have shown and described the preferred form of my invention, it will be obvious that various changes in the details of construction and in the proportions will be resorted to for successfully carrying the invention into practice without sacrificing any of the novel features or departing from the scope thereof.

What I claim is:—

1. In a device of the character described, the combination of a pair of cutting blades, having their outer edges substantially oval shaped in form, handle members formed integral at one end of the cutting blades and disposed substantially at right angles thereto, a thumb hold formed integral with one of said handle members, a curved arm formed integral with the other of said handle members, a strap having one end secured at the outer end of one of the handle members and its other end detachably connected to the outer end of said arm, a receptacle secured at one end to the outer edge portions of the cutting blades, means arranged in the other end of said receptacle to retain the same in a closed position, and means secured to the end of the receptacle to engage with the arm of the operator to support the lower end of the receptacle opposite the cutting blade.

2. In a device of the character described, the combination with a pair of cutting blades, handle members formed integral at one end thereof and disposed at substantially right angles thereto, a receptacle open at both ends and having one end secured to the outer edge portions of the cutting blades, and cleats transversely arranged in the other end of the receptacle, a resilient band disposed in the end of said receptacle and adapted to hold the same in a closed position, and means secured to the receptacle and adapted to engage with the arm of the operator to support the end of the receptacle.

3. In a device of the character described, the combination of a pair of cutting blades having substantially oval shaped outer edges, handle members formed integral with one end of the cutting blades and disposed at substantially right angles thereto, a receptacle open at both ends and having one of its ends secured to the outer edge portions of the cutting blades, a spring member arranged within one end of the receptacle and secured thereto to force the receptacle open when the cutting blades are opened, cleats arranged transversely within the other end of the receptacle, a resilient band arranged within the end of the receptacle and secured thereto to retain the end of the receptacle normally in a closed position, and a strap having its intermediate portions secured to the end of the receptacle and having its ends adapted to encircle the arm of the operator to support the rear end of the receptacle.

In testimony whereof I hereunto affix my signature in the presence of two witnesses.

FREDERICK T. LILLICK.

Witnesses:
 PAT SHANNON,
 GROVER C. ARNEST.